US008375770B2

(12) United States Patent
Lund (10) Patent No.: US 8,375,770 B2
(45) Date of Patent: Feb. 19, 2013

(54) ENGINE LEAK DETECTOR AND LEAK DETECTION METHOD

(75) Inventor: Stuart W. Lund, Orangevale, CA (US)

(73) Assignee: Redline Detection, LLC, Placentia, CA (US)

( * ) Notice: Subject to any disclaimer, the term of this patent is extended or adjusted under 35 U.S.C. 154(b) by 629 days.

(21) Appl. No.: 12/426,456

(22) Filed: Apr. 20, 2009

(65) Prior Publication Data

US 2010/0095746 A1    Apr. 22, 2010

Related U.S. Application Data

(60) Provisional application No. 61/046,518, filed on Apr. 21, 2008.

(51) Int. Cl.
*G01M 3/04* (2006.01)
(52) U.S. Cl. ............................................. 73/49.7; 73/40
(58) Field of Classification Search ........................ None
See application file for complete search history.

(56) References Cited

U.S. PATENT DOCUMENTS 5,107,698 A * 4/1992 Gilliam ........................... 73/40.7
5,777,209 A * 7/1998 Tien ............................... 73/40.7
7,305,176 B1 * 12/2007 Pieroni ........................... 392/395

OTHER PUBLICATIONS

Intake Pressure Testers for the Turbocharged Mitsubishi 3000GT/Dodge Stealth. http://www.stealth316.com/2-pressuretester.htm, Retrieved via Internet Archive. Dated Feb. 16, 2007.*
DSM Boost Leaks/Turbo Intake Pressure Tester. http://www.mirage-performance.com/EclipseGSX/BoostLeaks/index.html. , Retrieved via Internet Archive. Dated Feb. 8, 2007.*

* cited by examiner

*Primary Examiner* — Hezron E Williams
*Assistant Examiner* — Mark A Shabman
(74) *Attorney, Agent, or Firm* — Stetina Brunda Garred & Brucker (57) ABSTRACT

An apparatus and method for leak detection through use of an adapter containing a chamber, an air pressurization port, and detection media instillation port. The apparatus is sealingly or relatively sealingly coupled to a turbo inlet air duct on an internal combustion engine under study, such that the apparatus chamber communicates with the engine's interior void. The apparatus permits pressurized air and detective media, such as smoke or fog, to be introduced through the chamber and into the void of an engine to determine the presence and location of engine system leaks.

18 Claims, 9 Drawing Sheets

SECTION A-A

Figure 12

ENGINE LEAK DETECTOR AND LEAK DETECTION METHOD

CROSS-REFERENCE TO RELATED APPLICATIONS

This application claims the benefit under 35 U.S.C. §119 (e), to U.S. Provisional Application U.S. 61/046,518 filed Apr. 21, 2008, entitled "ENGINE LEAK DETECTOR AND LEAK DETECTION METHOD" which is incorporated by reference into this application as if fully set forth herein.

FIELD OF THE INVENTION

The present invention relates to engine diagnostic and maintenance equipment generally and to an apparatus and method for detecting air leaks in an internal combustion engine more specifically.

BACKGROUND

Ideally, an internal combustion engine is completely sealed, and vacuum leaks in such a system can result in problems ranging from decreased operating efficiency to engine failure. Detecting leaks can be a painstaking, time consuming, and often inefficient process. Accordingly, a variety of leak-detection systems, apparatus, and methods have been adapted. For example, U.S. Pat. No. 6,907,771 discloses, in part, a leak detecting apparatus that connects to a conventional air supply which provides air under pressure, the air being routed through a fluid tank where the air is directed against fluid to generate fog. U.S. Pat. No. 5,107,698 discloses, in part, an in situ vacuum leak detector where smoke is generated from a suitable smoke generating fluid in a chamber means, and sealably communicated to the intake manifold of a vacuum system of an internal combustion engine.

In considering a specific application, an actuated fault lamp for an example Ford 6.01t f250 engine, a typical diagnostic workup for an illuminated check-engine lamp may require verification that the intake and system are free of air leaks. This is particularly true where the lamp illumination is attributable to the On Board Diagnostic System II (OBD-II) generating fault code p0401 signaling inadequate Exhaust Gas Recirculation (EGR) flow detected by the Differential Pressure Feedback (DPFE) sensor. A common methodology to further determine the nature of this problem is to pump smoke into the Manifold Absolute Pressure (MAP) port followed by pressurization with shop air through the MAP port while blocking both the Intake Air Temp 2 (IAT2) port and the exhaust tail pipe. This method is problematic in that it is time consuming and inadequately detects leaks. A further weakness of this method is that the system is not pressurized in the same direction as normal operating conditions and therefore does not most accurately stress system seals. What is needed is an apparatus permitting quick and reliable leak detection. What is further needed is a leak detector apparatus permitting more accurate stressing of seals, emulating the engine's natural operating environment, by pressurizing the engine in the same direction as drive conditions.

SUMMARY

The present invention discloses an apparatus and method for more efficient and accurate leak detection through use of an adapter containing an air pressurization port and detection media instillation port. The apparatus permits introduction of smoke, fog, or other leak-detection media and pressurizing air through a chamber that is reversibly and sealably coupled to an engine's turbo inlet air duct. The apparatus fills the engine system with media and/or pressurized air, whereupon the user inspects the system for leaking media, such as smoke, escaping from the system.

DETAILED DESCRIPTION

Figure 1:
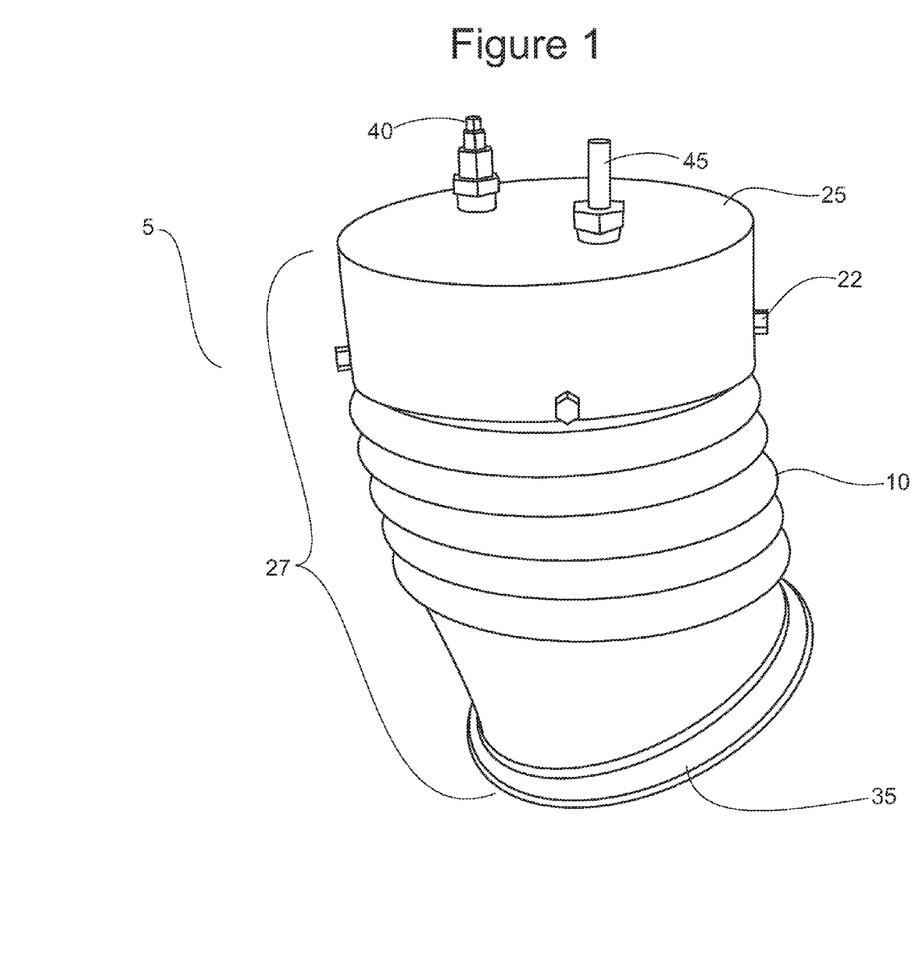
FIG. 1 is a perspective view of an embodiment of the apparatus.
Figure 2:
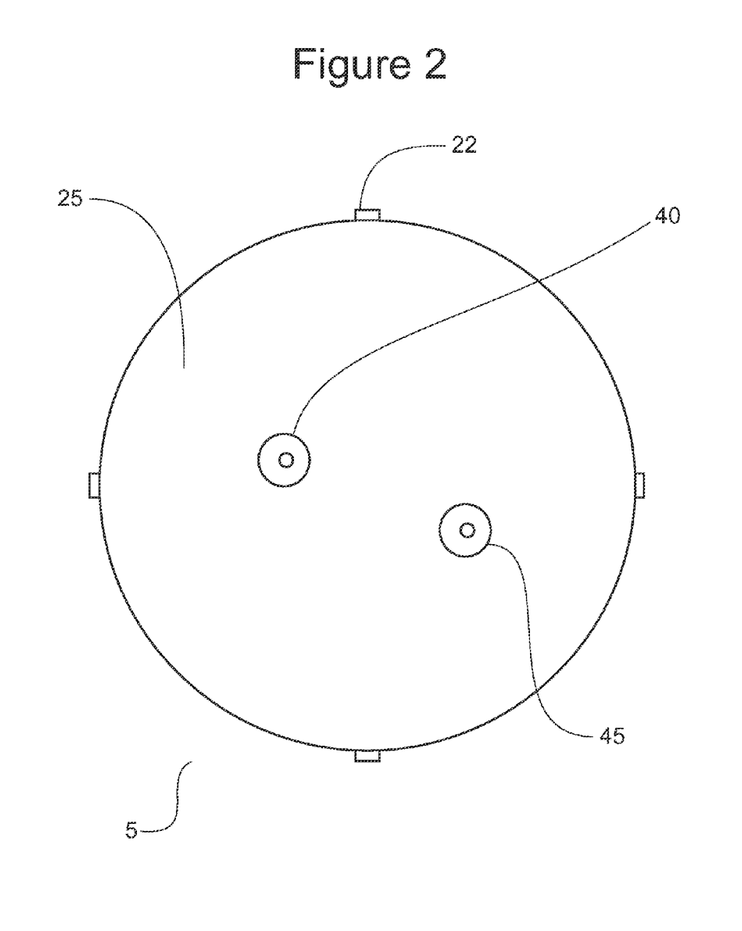
FIG. 2 is a top view of an embodiment of the apparatus.
Figure 3:
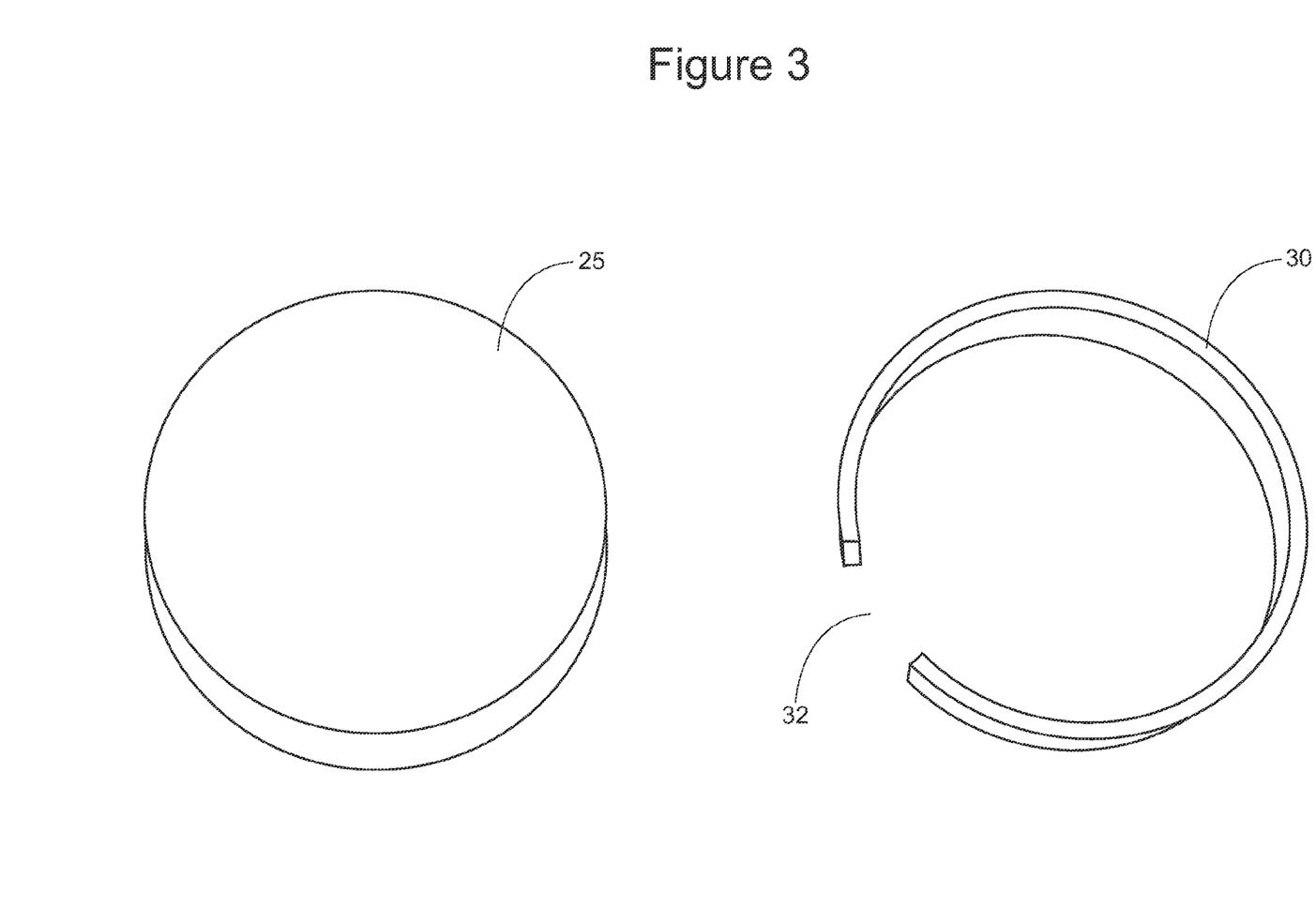
FIG. 3 is illustrates the end cap and reinforcing band utilized in one or more embodiments of the present invention.

In one embodiment, as illustrated by FIG. 1, apparatus 5 is comprised of a generally cylindrical corrugated housing 10 having a first end and second end. End cap 25 is coupled to the first end of housing 10 to form chamber 27. In one embodiment, chamber 27 is sealed, and in another embodiment chamber 27 is relatively sealed. In one embodiment, illustrated by FIG. 3, a reinforcing band 30, may be inserted within the relatively terminal aspect of the first end of housing 10 to provide added stability. End cap 25 then may be affixed to said first end of housing 10 by screws 22 which are driven through end cap 25, first end of housing 10, and finally reinforcing band 30. Reinforcing band 30 may be formed by removing a section 32 of a ring to permit insertion within the terminal aspect of first end of housing 10. As depicted on FIGS. 1 and 4, a securing means, such as clamp 35 is circumferentially disposed about the relatively terminal aspect of second end of housing 10 to secure apparatus 5 to turbo air intake duct 50 of an example engine. A variety of securing means may be utilized to affix the relatively terminal aspect of second end of housing 10 to a turbo air intake duct 50. Next, as illustrated by FIGS. 1 and 2, a pressurization means, such as a pressurization port 40, may be comprised of a one-quarter inch quick-connect air coupler nipple fitting, threadably driven through end cap 25 such that pressurization port 40 is relatively perpendicular to the diametrical surface of end cap 25. A means for instilling detective media, such as a media instillation port 45 may be comprised of a one-quarter inch corrugated MIP fitting, threadably driven through end cap 25 such that media instillation port 45 is relatively perpendicular to the diametrical surface of end cap 25.

In one embodiment, chamber 27 has a first end and second end wherein the first end is closed and the second end is open. In a specific preferred embodiment, chamber 27 is comprised of a singular, integrally formed plastic unit that may be formed by injection molding; in this embodiment, screws 22, and reinforcing band 30 are omitted and end cap 25 and housing 10 are integrally formed as chamber 27. Securing means 35, pressurization port 40, and instilling port 45 may be formed of metal, plastic, urethane, or any other material able to sufficiently deliver air and detection media respectively to chamber 27. In one embodiment, apparatus 5 is integrally formed plastic, and pressurization port 40, and instilling port 45 may be likewise comprised of integrally formed plastic.

In one embodiment, chamber 27 is sealingly closed when chamber 27 is coupled to turbo air intake duct 50. In another embodiment, chamber 27 is relatively closed when coupled to turbo air intake duct 50. A relative seal exists wherein pressure is sufficient to permit smoke aid air to fill the engine void, however, a relatively small amount of air may be permitted to escape through an incomplete seal in the system, such as, for example, at the junction of end cap 25 and housing 10 or on a fashioned location on chamber 27. An incompletely sealed system permits to user to audibly confirm when pressurization has occurred and generally gauge the amount of pressure in the system based upon the audible volume of air leaving the system. The incompletely sealed embodiment may be particularly useful where regulator 55 is not used, providing an added safety benefit where air and media, under undesirably high pressure, is permitted to escape, thereby eliminating sudden system displacement, rupture, or damage. An incomplete seal may further minimize damage to the engine or engine components attributable to overpressurization. In one preferred embodiment, chamber 27 is a single unit integrally formed through injection molding and will provide a complete seal when coupled to air intake duct 50.

Figure 4:
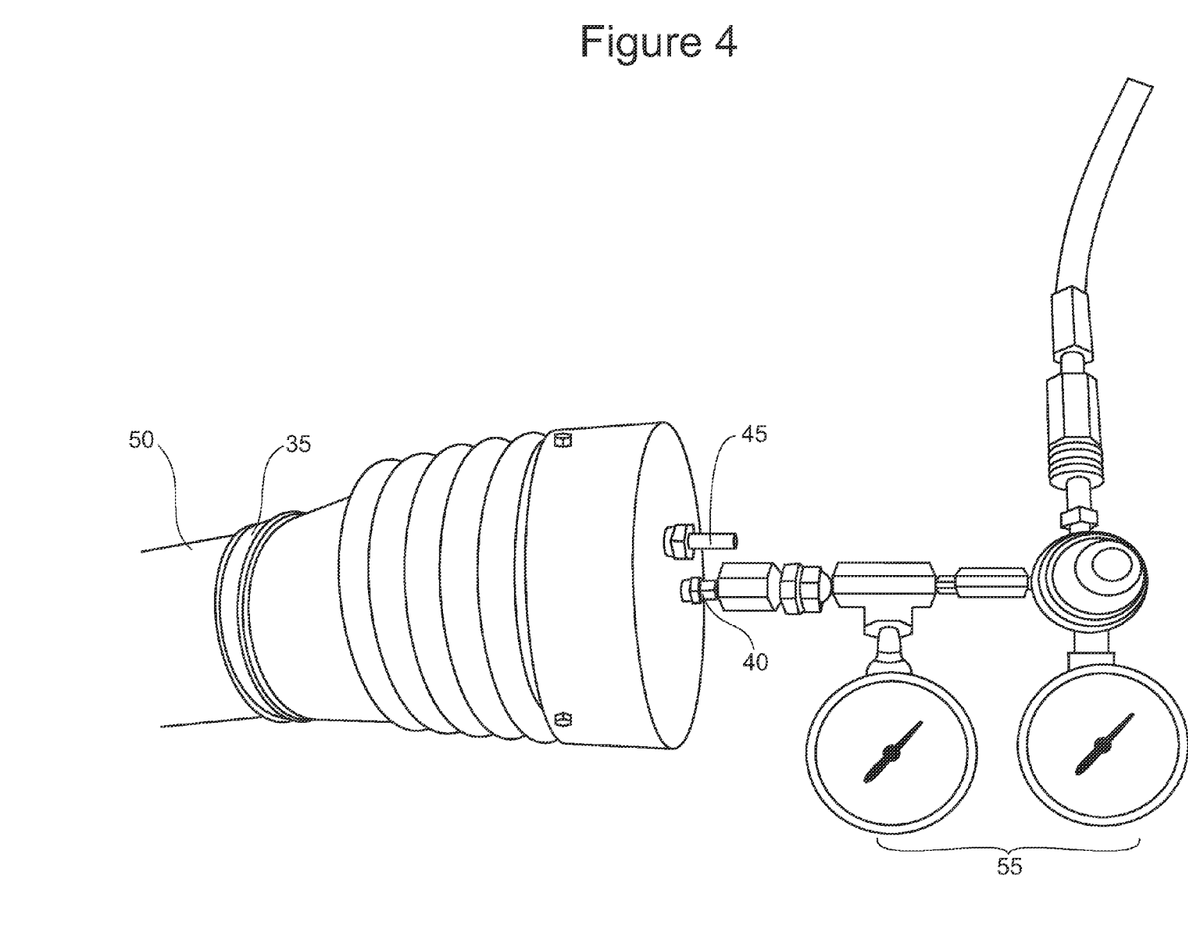
FIG. 4 is an illustration of an embodiment apparatus coupled to an example turbo air intake duct, and source of pressurized air, utilizing an optional pressure regulator.

In use, turning now to FIG. 4, apparatus 5 may be clampably secured to the turbo air intake duct 50 to form a relatively or completely sealed system wherein apparatus chamber 27 communicates with the interior void of an engine under study. Media instillation port 45 and pressurization port 40 are exposed and may be fitted with a line for introducing detective media and an air pressurization line respectively. In one embodiment, illustrated by FIG. 4 regulator 55 may be attached to pressurization port 40 to maintain air pressure at a designated maximum; in one particular embodiment, a pressurization pressure of 20 psi was determined to be useful in providing ample system pressurization and a safe working environment while minimizing engine damage.

Regarding the method of apparatus use with example smoke media, in one embodiment, apparatus 5 is clampably coupled, to turbo air intake. An EVAP (evaporative) smoke machine is operatively coupled to media instillation port 45 such that pressure from the machine will distribute smoke through intake. Next, a standard engine cylinder leakdown tester is coupled to pressurization port 40 with the regulator closed. Using Integrated Diagnostic Software (IDS) the EGR valve is actuated while in a key-on-engine-off (KOEO) status. The exhaust system is suitably obstructed, such as by plugging the tailpipe to provide a seal of the exhaust system; an example plug being a standard orange shipping cap from a Cold Air Charge (CAC) cooler. The system is externally inspected for leaking smoke with the EGR valve closed. In one embodiment, the user monitors the manifold absolute pressure sensor watching for a rise from about 14.7 psi, to about 14.9 psi, which indicates that the intake is full of smoke and confirms that a relatively substantial amount of media has been introduced into the engine. The user evaluates the system for leaks, if no leaks are detected, the user turns the EGR valve on to 85% open. The user then slowly introduces air pressure into the system; it may be preferable to keep the pressurization pressure at less than 20 psi inch to minimize potential engine damage generally and damage to the glow plug connectors in particular. However, it should be noted that pressure in excess of 20 psi may be utilized with the ERG valve open. To aid in the isolation of leaks, the user may use a stethoscope and/or apply soapy water to suspected leak sites.

Figure 5:
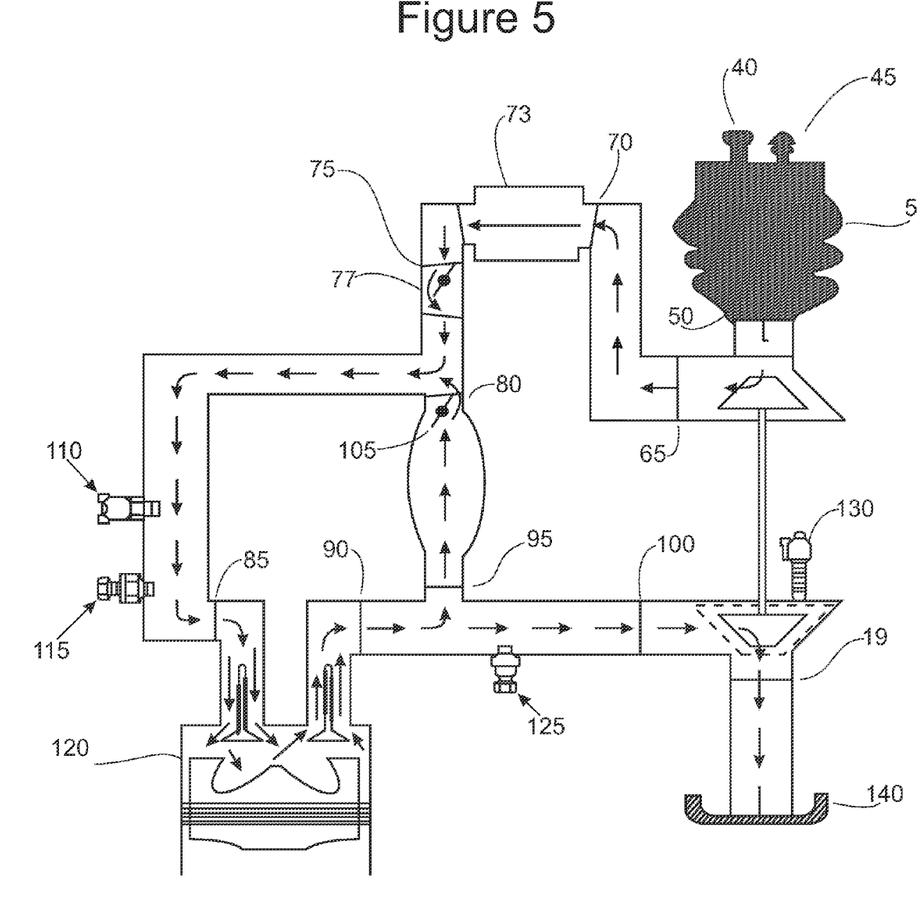
FIG. 5 is a schematic illustration identifying example common leak locations.
Figure 6:
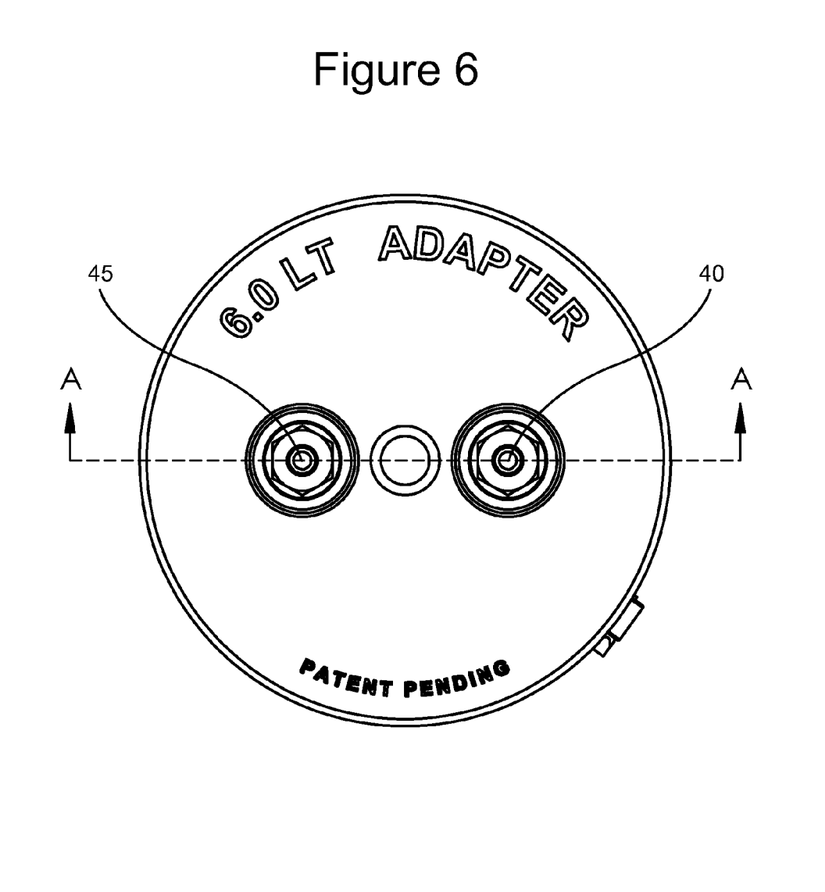
FIG. 6 is a front view of an embodiment apparatus.
Figure 7:
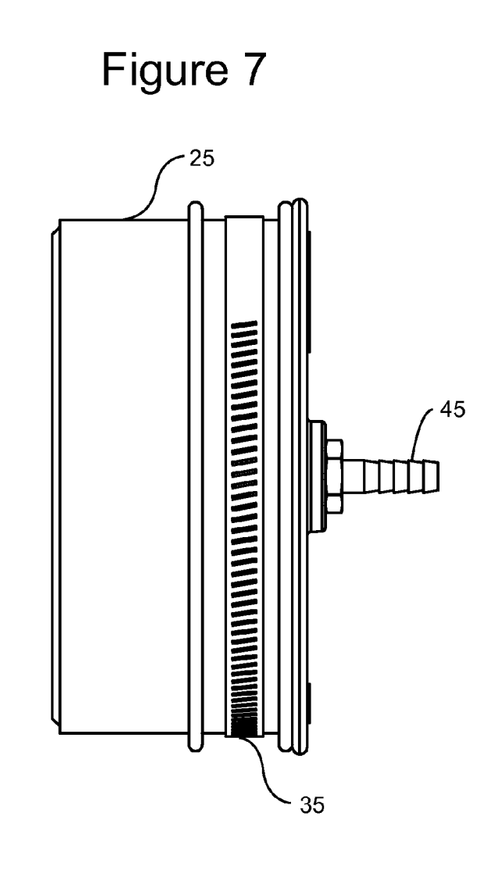
FIG. 7 is a side elevation view of an embodiment apparatus.
Figure 8:
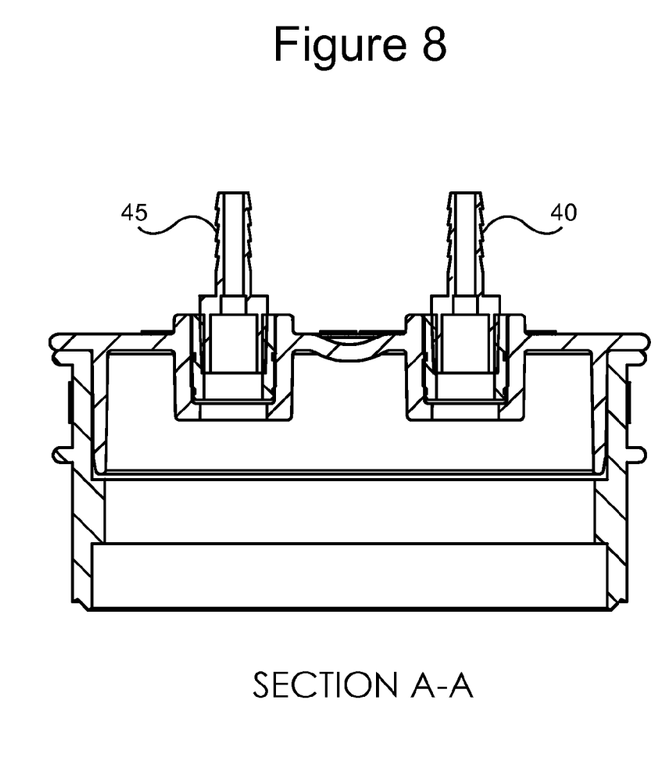
FIG. 8 is a cross-sectional view of an embodiment apparatus taken through line A-A of FIG. 6.
Figure 9:
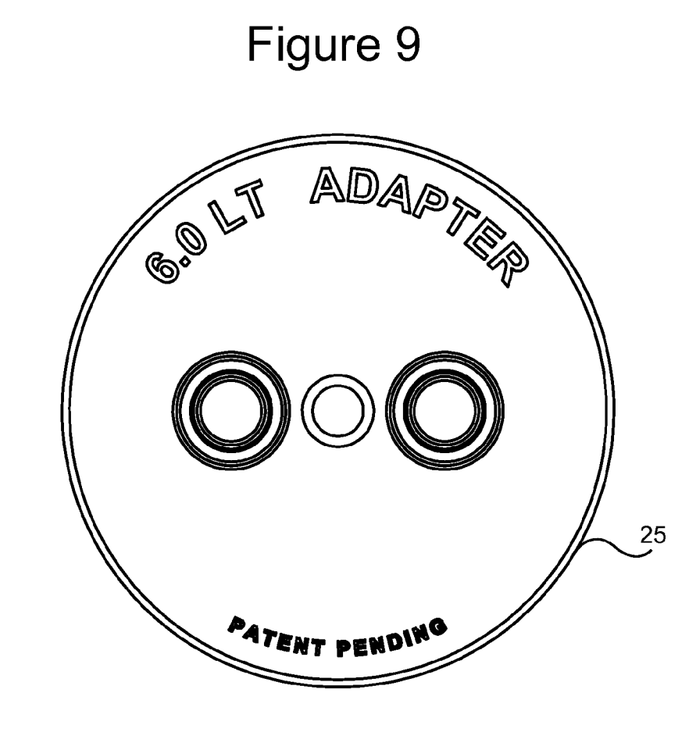
FIG. 9 is a view of an embodiment end cap of the apparatus.
Figure 10:
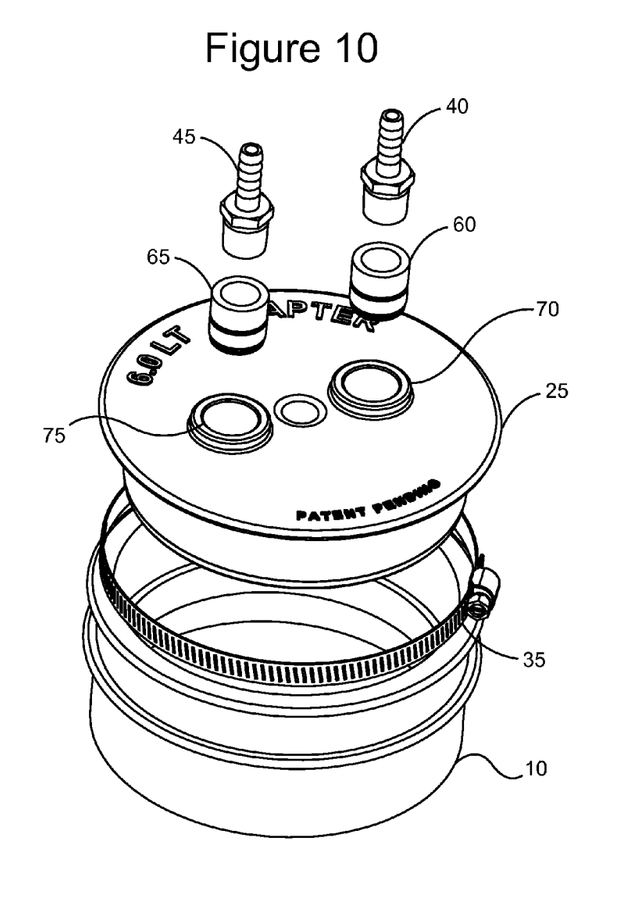
FIG. 10 is a perspective partially exploded view of an embodiment apparatus.
Figure 11:
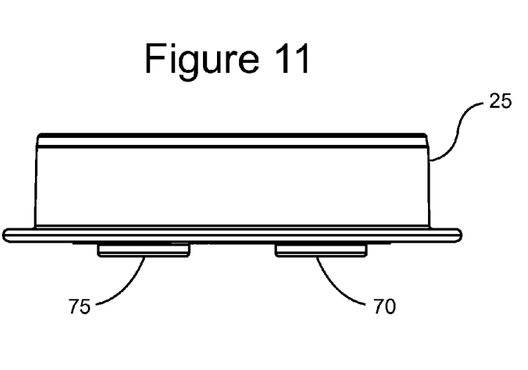
FIG. 11 is a side elevation view of an embodiment end cap of the apparatus.
Figure 12:
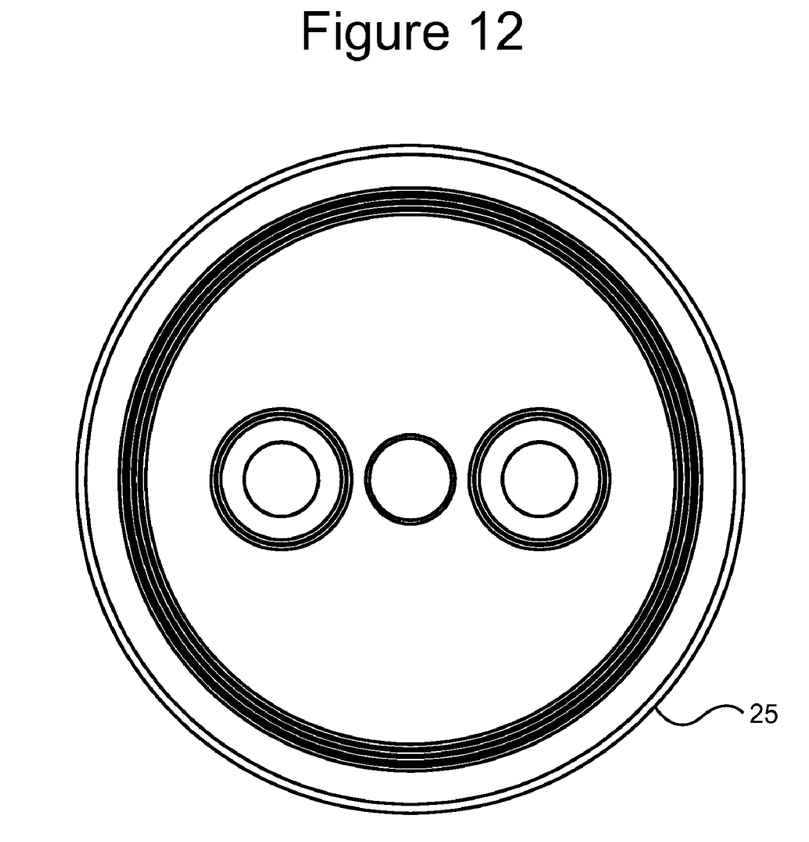
FIG. 12 is an inside view of an embodiment end cap of the apparatus.

Some example leak-prone locations in an example engine system are illustrated by schematic FIG. 5 which include, but are not limited to, the: air intake duct to turbo 50, turbo outlet to cooler 65, cooler inlet 70, air charge cooler 73, cooler outlet 75, EGR throttle plate 77, EGR cooler 80, intake gasket 85, exhaust manifold gasket 90, EGR cooler to exhaust extension 95, Y-pipe connection 100. As a subset of the compressor inlet, leaks may be discovered in the valve cover gasket and Positive Crankcase Ventilation PCV vent. Other components of the system are illustrated for clarity including the: EGR valve 105, intake air temp 2 (IAT2) 110, manifold absolute pressure (MAP), combustion chamber 120, exhaust pressure (EP), VTG Solenoid 130, and turbo outlet to exhaust 135, and plug at exhaust tail pipe 140.

FIGS. 6-12 illustrate one embodiment of the apparatus. In this embodiment, media instillation port 45 and pressurization port 40 may be identical, and may be ribbed to permit air and media lines to be slid thereupon and frictionally held in place. Cap 25 contains apertures 70 and 75 which accommodate brass fittings 70 and 75 respectively which permit ports 40 and 45 to be screwably fitted into cap 25.

In one embodiment, cap 25 and housing 10 are comprised of an integrally formed unit. In another embodiment, apparatus 5, including chamber 27 and fittings 40 and 45 are integrally formed of plastic. It should be noted in one embodiment housing 10 is described as corrugated, however, the invention may be practices with a non-corrugated housing. While a cylindrical apparatus shape is disclosed, the invention is not particular to shape, and a variety of shapes which permit a sealing connection between a chamber and turbo air intake. Further, various embodiments of the apparatus may be coupled to points other than the turbo air intake to permit pressurization and media instillation into the engine for the purpose of determining the presence of leaks. In another embodiment, only a single instillation port may be used, and the air and media may be introduced simultaneously or controlled through any valve permitting selective instillation of air and media, such as a stopcock.

Although the present invention has been described with reference to the preferred embodiments, it should be understood that various modifications and variations can be easily made by those skilled in the art without departing from the scope and spirit of the invention. Accordingly, the foregoing disclosure should be interpreted as illustrative only and is not to be interpreted in a limiting sense. It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

What is claimed is:

1. A leak detecting apparatus comprising:
   a chamber having a first end and a second end, wherein the first end is closed and the second end is open;
   a pressurization port affixed to the first end of said chamber and fluidly connectable to a pressurized air source to provide a first fluid flow path between the pressurized air source and said chamber;

a media instillation port affixed to the first end of said chamber and fluidly separate from the pressurization port wherein said media instillation port is fluidly connectable to a media source to provide a second fluid flow path between said media source and said chamber, said second flow path being fluidly separate from the first flow path; and a securing means disposed on the terminal most aspect of the second end of said chamber and configured to be engageable with a turbo air intake such that the securing means circumnavigates a portion of the turbo air intake when engaged therewith, the chamber being in fluid communication with the turbo air intake when the securing means is engaged therewith, wherein media is installable into said chamber through said media instillation port, wherein said chamber is pressurized by air introduced through said pressurization port, wherein said media and air communicate between said chamber and the interior of an internal combustion engine.

2. The apparatus according to claim 1, wherein said first end is sealingly closed.

3. The apparatus according to claim 1, wherein said first end is relatively closed.

4. The apparatus according to claim 1, wherein said chamber is cylindrically shaped.

5. The apparatus according to claim 4, wherein at least a portion of said cylindrically shaped chamber is corrugated.

6. The apparatus according to claim 1, wherein said chamber is comprised of: a generally cylindrical corrugated housing having a first end and second end, and an end cap coupled to said chamber's first end.

7. The apparatus according to claim 6, wherein the pressurization port and media instillation port are formed in the end cap in spaced relation to each other.

8. The apparatus according to claim 6, wherein the housing is configured to be operative in a completely sealed mode and an incompletely sealed mode, in the completely sealed mode, the housing being engageable with the turbo air intake to form a fluid tight seal therebetween, in the incompletely sealed mode, the housing being engageable with the turbo air intake such that an incomplete fluid tight seal is formed between the housing and the turbo air intake.

9. The apparatus according to claim 8, wherein the housing is configured to emit an audible signal during testing in the incompletely sealed mode.

10. The apparatus according to claim 1, wherein said pressurization port is a threadably driven one-quarter inch quick-connect air coupler nipple fitting, wherein said nipple is disposed relatively perpendicular to the end of said chamber.

11. The apparatus according to claim 1, wherein said media instillation port is a threadably driven one-quarter inch corrugated MIP fitting, wherein said fitting is disposed relatively perpendicular to the end of said chamber.

12. The apparatus of claim 1, wherein said chamber is integrally formed of plastic.

13. A leak detecting apparatus comprising:

a housing having a closed first end portion and an opposed open second end portion, the housing defining a chamber;

a pressurization port formed within the closed first end portion of the housing, the pressurization port being configured to facilitate introduction of pressurization fluid into the chamber;

a media instillation port formed within the closed first end portion of the housing in spaced relation to the pressurization port, the media instillation port being configured to facilitate installation of media into said chamber; and a securing means disposed the second end portion of the housing and configured to be engageable with a turbo air intake, the chamber being in fluid communication with the turbo air intake when the securing means is engaged therewith, wherein media is installable into said chamber through said media instillation port, wherein said chamber is pressurized by air introduced through said pressurization port, wherein said media and air communicate between said chamber and the interior of an internal combustion engine;

the housing, pressurization port and media instillation port being configured such that the pressurization fluid and media remain fluidly isolated upstream of the housing.

14. The apparatus according to claim 13, wherein the housing is corrugated to allow for selective adjustment in the size of the housing.

15. The apparatus according to claim 13, wherein the housing is configured to be operative in a completely sealed mode and an incompletely sealed mode, in the completely sealed mode, the housing being engageable with the turbo air intake to form a fluid tight seal therebetween, in the incompletely sealed mode, the housing being engageable with the turbo air intake such that an incomplete fluid tight seal is formed between the housing and the turbo air intake.

16. The apparatus according to claim 15, wherein the housing is configured to emit an audible signal during testing in the incompletely sealed mode.

17. The apparatus according to claim 15, wherein the securing means is configured to effectuate selective transition between the completely sealed mode and the incompletely sealed mode.

18. The apparatus according to claim 15, wherein the securing means is configured to circumnavigate a portion of the turbo air intake when engaged therewith.

* * * * *